(12) United States Patent (10) Patent No.: US 7,563,527 B2
Tanaka et al. (45) Date of Patent: Jul. 21, 2009

(54) FUEL CELL-ATMOSPHERIC-PRESSURE TURBINE HYBRID SYSTEM

(75) Inventors: Kazuo Tanaka, Kobe (JP); Eiichi Harada, Kakogawa (JP); Takatoshi Shoji, Kobe (JP); Junichi Kitajima, Akashi (JP); Seiji Yamashita, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 229 days.

(21) Appl. No.: 10/553,692

(22) PCT Filed: Jun. 29, 2004

(86) PCT No.: PCT/JP2004/009130

§ 371 (c)(1),
(2), (4) Date: Oct. 18, 2005

(87) PCT Pub. No.: WO2005/001974

PCT Pub. Date: Jan. 6, 2005

(65) Prior Publication Data

US 2006/0222919 A1 Oct. 5, 2006

(30) Foreign Application Priority Data

Jun. 30, 2003 (JP) ............................ 2003-186933
Mar. 5, 2004 (JP) ............................ 2004-062096

(51) Int. Cl.
*H01M 8/04* (2006.01)
(52) U.S. Cl. ......................................... 429/22; 429/26

(58) Field of Classification Search .................. 429/12, 429/13, 22, 23, 24, 26
See application file for complete search history.

(56) References Cited

U.S. PATENT DOCUMENTS

| 5,986,680 | A | * | 11/1999 | Wen et al. ................. 346/140.1 |
| 2004/0150366 | A1 | * | 8/2004 | Ferrall et al. ................. 320/101 |
| 2006/0019139 | A1 | * | 1/2006 | Matsui et al. ................. 429/26 |
| 2006/0162316 | A1 | * | 7/2006 | Tanaka et al. ............. 60/39.511 |

FOREIGN PATENT DOCUMENTS

| EP | A-0 400 701 | 12/1990 |
| JP | A-61-128471 | 6/1986 |
| JP | A-63-119163 | 5/1988 |

(Continued)

*Primary Examiner*—Patrick Ryan
*Assistant Examiner*—Monique Wills
(74) *Attorney, Agent, or Firm*—Oliff & Berridge, PLC (57) ABSTRACT

A fuel cell-atmospheric-pressure turbine hybrid system uses the thermal energy of a cell exhaust gas discharged from an atmospheric-pressure, high-temperature fuel cell effectively, does not need any additional emergency protective device, and enables the use of lightweight, easy-to-process structural and piping materials to reduces the cost.

The fuel cell-atmospheric-pressure turbine hybrid system includes: a combustor 2 for burning an exhaust gas G1 discharged from an atmospheric-pressure, high-temperature fuel cell 1; a turbine 3 in which a combustion gas G2 discharged from the combustor 2 expands and the pressure of the combustion gas G2 drops to a negative pressure; a compressor 4 for compressing an exhaust gas G3 discharged from the turbine 3 to increase the pressure of the exhaust gas G3; and a heat exchanger 5 for transferring heat from the high-temperature exhaust gas G3 discharged from the turbine 3 to low-temperature air A to be supplied to the fuel cell 1.

11 Claims, 6 Drawing Sheets

| | FOREIGN PATENT DOCUMENTS | |
|---|---|---|
| JP | A-63-216270 | 9/1988 |
| JP | A-08-045523 | 2/1996 |
| JP | A-10-012255 | 1/1998 |
| JP | A-2000-228208 | 8/2000 |
| JP | A-2002-188438 | 7/2002 |
| JP | A-2003-193865 | 7/2003 |
| JP | A-2003-288907 | 10/2003 |

* cited by examiner

FUEL CELL-ATMOSPHERIC-PRESSURE TURBINE HYBRID SYSTEM

TECHNICAL FIELD

The present invention relates to a fuel cell-atmospheric-pressure turbine hybrid system built by combining an atmospheric-pressure, high-temperature fuel cell and an atmospheric-pressure turbine and capable of efficiently generating electric power.

BACKGROUND ART

Each of known hybrid systems of this kind disclosed in Patent documents 1 and 2 includes a combination of a high-pressure fuel cell and a gas turbine for driving a generator.

Patent document 1: JP 8-45523 A (FIG. 1 and the specification)

Patent document 2: JP 10-12255 A (FIG. 1 and the specification)

The conventional hybrid system using a gas turbine combined with a compressor, and a high-pressure fuel cell that operates at a high pressure equal to or higher than the output pressure of the compressor has the following problems. A small hybrid system has a small gas turbine, and a fuel cell contained in a high-temperature, high-pressure container. Therefore, the hybrid system needs a protective device capable of properly carrying out a shutdown procedure and of discharging a high-temperature, high-pressure gas outside the system in an emergency. The protective device imposes a large cost load on the small hybrid system. The hybrid system needs a differential pressure control system and control techniques for limiting the variation of differential pressure during emergency shutdown within an allowable range determined on the basis of the structural strength of the fuel cell. The differential pressure control system also increases the cost of the hybrid system. The high-temperature, high-pressure container and the high-temperature, high-pressure pipes also increases the cost of the hybrid system.

DISCLOSURE OF THE INVENTION

Accordingly, it is an object of the present invention to provide a fuel cell-atmospheric-pressure turbine hybrid system built by combining an atmospheric-pressure, high-temperature fuel cell and an atmospheric-pressure turbine, capable of effectively using the thermal energy of the exhaust gas discharged from the high-temperature fuel cell, not additionally needing an emergency protection device and having simple construction.

A fuel cell-atmospheric-pressure turbine hybrid system includes: a combustor for burning an exhaust gas discharged from an atmospheric-pressure, high-temperature fuel cell; a turbine in which a combustion gas discharged from the combustor expands and the pressure of the combustion gas drops to a negative pressure; a compressor for compressing an exhaust gas discharged from the turbine to increase the pressure of the exhaust gas; and a heat exchanger for transferring heat from the high-temperature exhaust gas discharged from the turbine to low-temperature air to be supplied to the fuel cell. The term "atmospheric pressure" signifies the pressure of the environment in which the system is installed and the term "negative pressure" signifies a pressure lower than the atmospheric pressure.

Fuel and air interact through an electrolyte in the fuel cell to generate power and the fuel cell discharges a high-temperature cell exhaust gas. The combustor burns the high-temperature cell exhaust gas and discharges a combustion gas. The turbine is driven by the combustion gas of a pressure approximately equal to the atmospheric pressure. The combustion gas expands and the pressure of the combustion gas drops to a negative pressure while the combustion gas flows through the turbine. The compressor raises the pressure of the exhaust gas discharged from the turbine. The expanded exhaust gas discharged from the turbine. The heat exchanger transfers the heat of the expanded exhaust gas discharged from the turbine to low-temperature air to be supplied to the fuel cell. Since the exhaust gas is supplied to the compressor after the temperature of the exhaust gas has been thus decreased, the exhaust gas can be compressed at a high compression efficiency and thereby the efficiency of the gas turbine is improved. The air heated at a high temperature by the heat of the exhaust gas discharged from the turbine is supplied to the fuel cell to increase power generation efficiency. The combination of the atmospheric-pressure, high-temperature fuel cell and the atmospheric-pressure turbine enables the effective use of the thermal energy of the high-temperature cell exhaust gas discharged from the fuel cell, does not produce any high pressures in the system, makes an additional emergency protective device unnecessary, and enables the use of lightweight, easy-to-process structural and piping materials to reduces the cost.

Preferably, the exhaust gas discharged from the compressor is mixed in the air to be supplied to the fuel cell. Particularly, when the fuel cell is a molten carbonate fuel cell (MCFC), the exhaust gas can be supplied to the fuel cell by a low-power blower or the like instead of compressing and supplying the exhaust gas to the fuel cell by a recycle blower. Therefore, the partial pressure of carbon dioxide around the cathode can be easily increased and power generation efficiency can be improved even under an operating condition where cathodic reaction rate is low.

Preferably, a cooler is disposed below the heat exchanger to cool an exhaust gas discharged from the heat exchanger. The respective efficiencies of the compressor and the gas turbine can be improved by supplying the exhaust gas discharged from the heat exchanger to the compressor after cooling the exhaust gas by the cooler.

A preferred embodiment of the present invention includes a second compressor disposed coaxially with the compressor serving as a first compressor to compress the exhaust gas discharged from the compressor, and a second cooler for cooling the exhaust gas to be supplied to the second compressor. The respective operating efficiencies of the compressors are increased and the efficiency of the gas turbine is increased because the exhaust gas supplied to the compressors is cooled. The coaxially disposed compressors have one and the same shaft.

Another embodiment of the present invention includes an evaporator capable of recovering heat from the exhaust gas discharged from the turbine and generating steam by the recovered heat, and a reforming device for reforming the fuel by using steam generated by the steam generator and supplying the reformed fuel to the fuel cell. Thus the fuel is reformed by the steam generated by the evaporator using waste heat of the system. When the fuel is natural gas, natural gas can be reformed to produce a fuel gas of high-quality having high CO and $H_2$ concentrations for fuel cells.

A third embodiment of the present invention is provided with an air intake branch line through which part of air to be supplied to the fuel cell flows. When air is supplied at an excessively high flow rate to the fuel cell, part of the air is supplied through the air intake branch line to the combustor. When air is supplied at an excessively high flow rate higher than a flow rate suitable for supplying air to the fuel cell to the heat exchanger disposed above the fuel cell to cool the exhaust gas discharged from the turbine satisfactorily, excessive air is carried by the air intake branch line to the combustor and is used for burning the cell exhaust gas discharged from the fuel cell in the combustor.

The fuel cell-atmospheric-pressure turbine hybrid system may be provided with a fuel supply device for supplying a fuel other than the cell exhaust gas. The combustion temperature of the cell exhaust gas can be controlled by burning the fuel supplied by the fuel supply device in the combustor to facilitate controlling the output of the turbine.

A fourth embodiment of the present invention includes a second turbine disposed coaxially with the turbine as a first turbine, a second combustor disposed between the first and the second turbine and capable of burning a fuel and an exhaust gas discharged from the second turbine and of supplying a combustion gas to the first turbine. The exhaust gas discharged from the first turbine is supplied to the heat exchanger. The second combustor burns the exhaust gas discharged from the second turbine and supplies the high-temperature combustion gas to the first turbine. Consequently, the output of the first turbine increases.

A fuel cell-atmospheric-pressure turbine hybrid system in a second aspect of the present invention includes: a combustor for burning a cell exhaust gas discharged from an atmospheric-pressure, high-temperature fuel cell; a turbine in which a combustion gas of a pressure substantially equal to the atmospheric pressure discharged from the combustor expands and the pressure of the combustion gas drops to a negative pressure; a compressor for compressing an exhaust gas discharged from the turbine to increase the pressure of the exhaust gas; and an air supply line through which air is supplied to the combustor.

The fuel cell-atmospheric-pressure turbine hybrid system in the second aspect of the present invention, similarly to the fuel cell-atmospheric-pressure turbine hybrid system in the first aspect of the present invention, includes the atmospheric-pressure, high-temperature fuel cell and the atmospheric-pressure turbine in combination. Therefore, the thermal energy of the high-temperature cell exhaust gas discharged from the fuel cell can be effectively used, any high pressures are not produced in the system, an additional emergency protective device is unnecessary, and lightweight, easy-to-process structural and piping materials can be used to reduce the cost. Since the exhaust gas discharged from the turbine is supplied to the fuel cell after the pressure of the exhaust gas has been increased by the compressor, the thermal energy of the exhaust gas can be effectively used by the fuel cell without using a circulation blower or the like. The MCFC needs much $CO_2$ around the cathode. Since the exhaust gas has a high $CO_2$ concentration, the power generation efficiency of the fuel cell increases. Oxygen can be supplied to the combustor at an increased rate by supplying air through the air supply line into the combustor. Consequently, the combustion efficiency of the combustor can be increased.

Another embodiment of the present invention includes a heat exchanger for transferring heat of an exhaust gas discharged from the turbine to an exhaust gas discharged from the compressor. The high-temperature exhaust gas discharged from the turbine and cooled at a low temperature through heat exchange in the heat exchanger and the low-temperature exhaust gas is supplied to the inlet of the compressor. Thus the power for driving the compressor can be decreased and the efficiency of the turbine can be increased. The exhaust gas discharged from the compressor is heated at a high temperature by the heat of the high-temperature exhaust gas discharged from the turbine in the heat exchanger, and the high-temperature exhaust gas is supplied to the fuel cell. Consequently, the power generation efficiency of the fuel cell can be further increased.

A preferred embodiment of the present invention includes an air supply branch line branched from the air supply line to supply part of air flowing through the air supply line to the fuel cell. Thus the power generation efficiency of the fuel cell can be increased.

Another embodiment of the present invention further includes an air distribution valve placed at the joint of the air supply line and the air supply branch line to adjust the distribution of air to the air supply line and the air supply branch line. Thus air can be properly supplied to the fuel cell according to the type and capacity of the fuel cell to increase the efficiency of the fuel cell. When the fuel cell is a solid oxide fuel cell (SOFC), the cathode of the fuel cell does not need much carbon dioxide gas, but needs much oxygen, Therefore, the air distribution valve is operated so as to supply air at an increased flow rate to the fuel cell. When the fuel cell is a MCFC, the cathode of the fuel cell needs much carbon dioxide gas. Therefore, the air distribution valve is operated to stop supplying air to the fuel cell or to reduce the flow rate air flowing into the fuel cell so that the carbon dioxide concentration of the exhaust gas compressed by the compressor and supplied to the fuel cell increases.

As apparent from the foregoing description, the fuel cell-atmospheric-pressure turbine hybrid system of the present invention effectively uses the thermal energy of the cell exhaust gas discharged from the atmospheric-pressure, high-temperature fuel cell, does not need any emergency protective device, and enables the use of lightweight, easy-to-process structural and piping materials to reduces the cost.

BEST MODE FOR CARRYING OUT THE INVENTION

Preferred embodiments of the present invention will be described with reference to the accompanying drawings.

Figure 1:
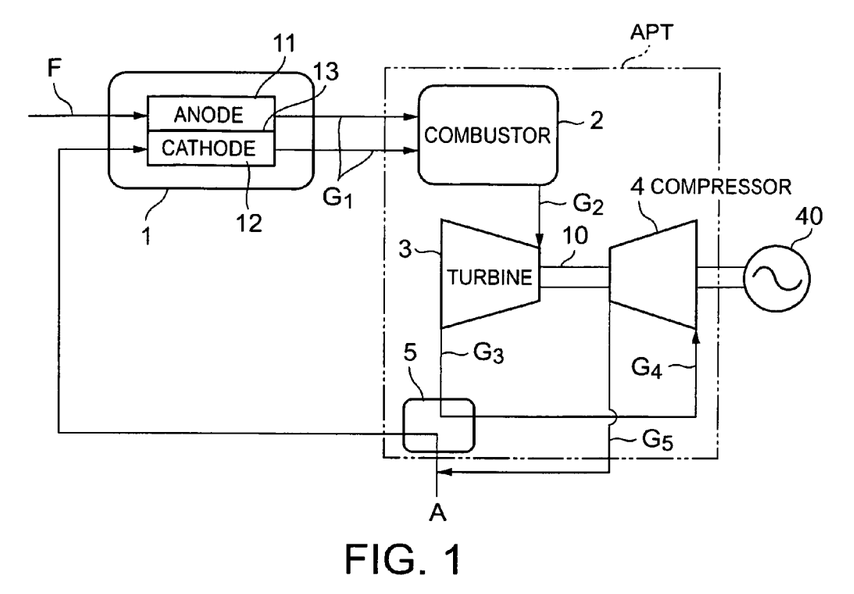
FIG. 1 is a block diagram of a fuel cell-atmospheric turbine hybrid system in a first embodiment according to the present invention.

FIG. 1 shows a fuel cell-atmospheric-pressure turbine hybrid system in a first embodiment according to the present invention in a block diagram. Referring to FIG. 1, the fuel cell-atmospheric-pressure turbine hybrid system includes an atmospheric-pressure, high-temperature fuel cell 1 and an atmospheric-pressure turbine APT in combination. The atmospheric-pressure turbine APT uses a cell exhaust gas G1 of a pressure substantially equal to the atmospheric pressure discharged from the fuel cell 1 as a fuel. The atmospheric-pressure turbine APT is provided with a combustor 2 for burning the cell exhaust gas G1 discharged from the fuel cell 1, a turbine 3 in which a combustion gas G2 discharged from the combustor expands and the pressure of the combustion gas drops to a negative pressure, a compressor 4 driven by the turbine 3 to increase the pressure of an exhaust gas discharged from the turbine 3, and a heat exchanger 5 for transferring the heat of the high-temperature exhaust gas G3 discharged from the turbine 3 to environmental, low-temperature air A to be supplied to the fuel cell 1. The atmospheric-pressure turbine APT is of a single-shaft type. The turbine 3 and the compressor 4 has one and the same shaft 10 in common. The shaft 10 is connected to a generator 40, namely, a load on the atmospheric-pressure turbine APT. The atmospheric-pressure turbine APT may be of a dual shaft type provided with first and second shafts, the turbine 3 and the compressor 4 may be linked by the first shaft, and the turbine 3 and the generator 40 may be linked by the second shaft.

In the first embodiment shown in FIG. 1, the fuel cell 1 is a MCFC. The fuel cell 1 has an anode 11, a cathode 12 and an electrolyte layer 13 extending between the anode 11 and cathode 12. Carbon monoxide (CO) and hydrogen gas ($H_2$) generated from the fuel F of a normal pressure supplied to the anode 11 and air A of a normal pressure supplied to the cathode 12 interact through the electrolyte layer 13 to generate electric power. The fuel F is, for example, natural gas.

The combustor 2 burns a normal-pressure, high-temperature cell exhaust gas G1 containing unreacted gases and excess air and discharged from the fuel cell 1 and discharges an exhaust gas G2. The turbine 3 is driven by the exhaust gas G2 received from the combustor 2. The turbine 3 drives the compressor 4 and the generator 40. The combustion gas G2 expands and the pressure thereof decreases to a negative pressure as the combustion gas S2 flows through the turbine 3 and becomes a negative-pressure, intermediate-temperature exhaust gas G3. The heat exchanger 5 transfers the heat of the exhaust gas G3 to the low-temperature air A to be supplied to the fuel cell 1. The exhaust gas G3 thus used for heating the air A becomes a low-temperature exhaust gas G4. The compressor 4 compresses the exhaust gas G4 at the atmospheric pressure. Since the exhaust gas G4 has a low temperature, the compressor 4 is able to compress the exhaust gas G4 efficiently, which improves the efficiency of the atmospheric-pressure turbine APT. The air A heated at a high temperature by the heat exchanger 5 is supplied to the cathode 12 of the fuel cell 1. Oxygen contained in the air A serves as an oxidizer to promote the chemical reactions of the components of the fuel F and, consequently, power generating efficiency is increased. An exhaust gas G5 discharged from the compressor 4 is supplied to the fuel cell 1 and is mixed with the air A.

The fuel cell 1 is of an atmospheric-pressure, high-temperature type and the atmospheric-pressure turbine APT is of an atmospheric pressure type. Therefore, the atmospheric-pressure turbine APT is able to use effectively the thermal energy of the high-temperature cell exhaust gas G1 discharged from the fuel cell 1. Any high pressures are not developed in the system, any emergency protective device, which is indispensable to the conventional fuel cell-turbine hybrid system, is not necessary. Therefore, lightweight, easy-to-process structural and piping materials can be used for constructing the fuel cell 1 and the bathometric-temperature turbine APT and thereby the system can be manufactured at a low cost.

The exhaust gas G5 discharged from the compressor 4 is mixed in the air A to be supplied to the fuel cell 1. Therefore, the exhaust gas G5 can be supplied to the atmospheric-pressure fuel cell by a blower or the like requiring very low power, while the exhaust gas G5 is supplied to a high-pressure fuel cell by a recycle blower in the conventional hybrid system. Consequently, the partial pressure of carbon dioxide around the cathode 12 can be easily increased and power generation efficiency can be improved even under an operating condition where cathodic reaction rate is low. The fuel cell 1 may be a SOFC. When fuel cell 1 is a SOFC, the exhaust gas G5 is not mixed in the air A and is discharged outside of the system.

Figure 2:
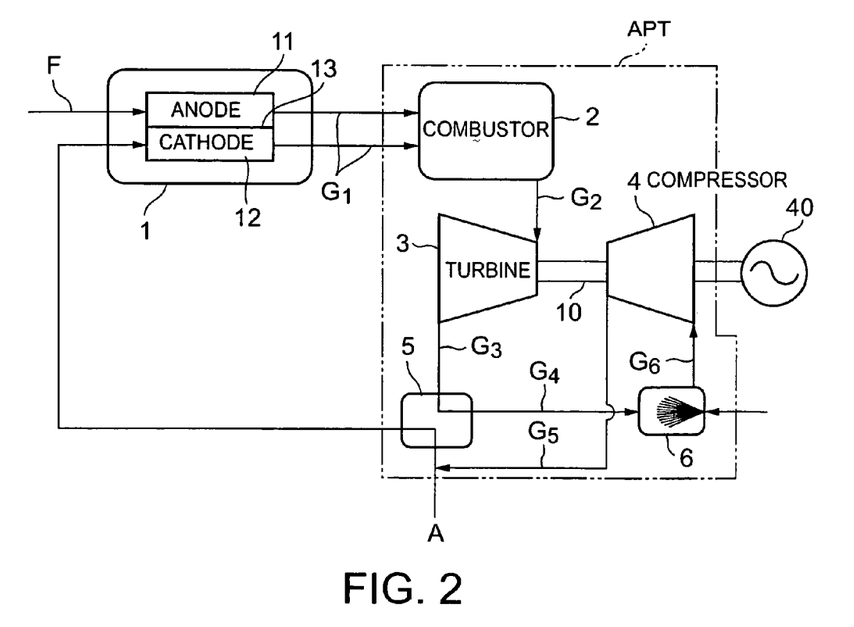
FIG. 2 is a block diagram of a fuel cell-atmospheric-pressure turbine hybrid system in a second embodiment according to the present invention.

FIG. 2 shows a fuel cell-atmospheric-pressure turbine hybrid system in a second embodiment according to the present invention. Basically, the fuel cell-atmospheric-pressure turbine hybrid system in the second embodiment is similar to the fuel cell-atmospheric-pressure turbine hybrid system in the first embodiment shown in FIG. 1. The fuel cell-atmospheric-pressure turbine hybrid system shown in FIG. 2 includes, in addition to components corresponding to those of the first embodiment, a spray type cooling device 6. The cooling device 6 is disposed between the compressor 4 and the heat exchanger 5. The cooling device 6 sprays water on an exhaust gas G4 discharged from the heat exchanger 5 to cool the exhaust gas G4. Then, a moistened exhaust gas G6 is supplied to the compressor 4. The moisture contained in the exhaust gas G6 evaporates in the compressor 4 and absorbs latent heat of vaporization from the exhaust gas G6 to cool the exhaust gas G6 at a low temperature. Consequently, the compressor compresses the exhaust gas G6 at a high efficiency and the efficiency of the atmospheric-pressure turbine APT is improved.

Figure 3:
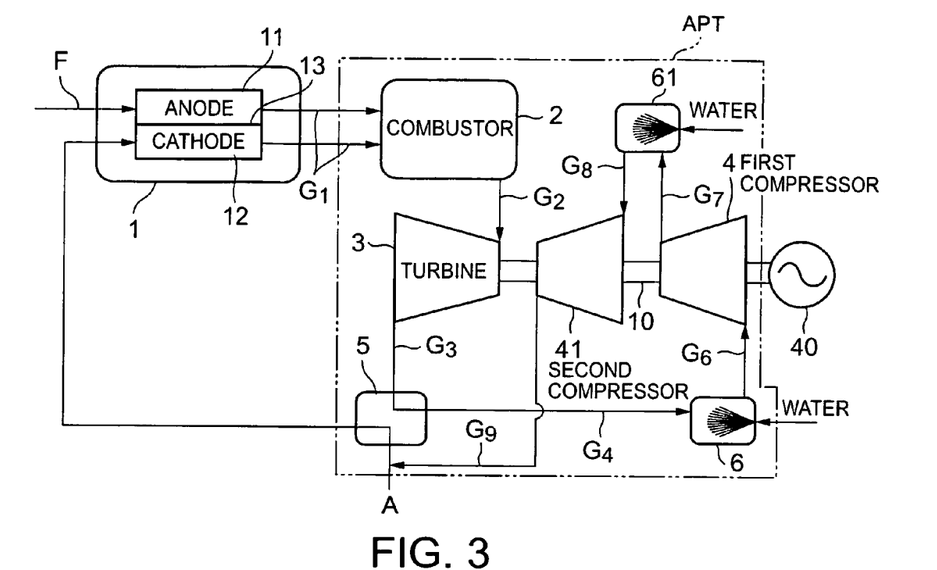
FIG. 3 is a block diagram of a fuel cell-atmospheric-pressure turbine hybrid system in a third embodiment according to the present invention.

FIG. 3 shows a fuel cell-atmospheric-pressure turbine hybrid system in a third embodiment according to the present invention. The fuel cell-atmospheric-pressure turbine hybrid system in the third embodiment includes, in addition to components corresponding to those of the fuel cell atmospheric-pressure turbine hybrid system in the second embodiment, a second compressor 41 disposed coaxially with the first compressor 4 corresponding to the compressor 4 of the second embodiment and having a shaft 10 in common with the first compressor 4, a first cooling device 6 corresponding to the cooling device 6 of the second embodiment, a spray type second cooling device 61 disposed between the first compressor 4 and the second compressor 41 to cool an exhaust gas G7 discharged from the first compressor 4. The second cooling device 61 sprays water on the exhaust gas G7 discharged from the first compressor 4 to cool the exhaust gas G7. Then, a moistened exhaust gas G8 is supplied to the second compressor 41. The moisture contained in the exhaust gas G8 evaporates in the second compressor 41 and absorbs latent heat of vaporization from the exhaust gas G8 to cool the exhaust gas G8 at a low temperature. An exhaust gas G9 discharged from the second compressor 41 is mixed in the air A, carbon dioxide that serves as an oxygen-carrying medium in the fuel cell 1 is recovered and is supplied to the cathode 12. Since the two cooling devices 6 and 61 cools the exhaust gases G6 and G8 flowing into the two compressors 4 and 41, respectively. Consequently, the compressors 4 and 41 compress the exhaust gases G6 and G8 at a high efficiency and the efficiency of the atmospheric-pressure turbine APT is improved. The spray type cooling devices 6 and 61 shown in FIGS. 2 and 3, namely, direct type water sprayers, may be replaced with indirect type cooling devices internally provided with cooling pipes.

Figure 4:
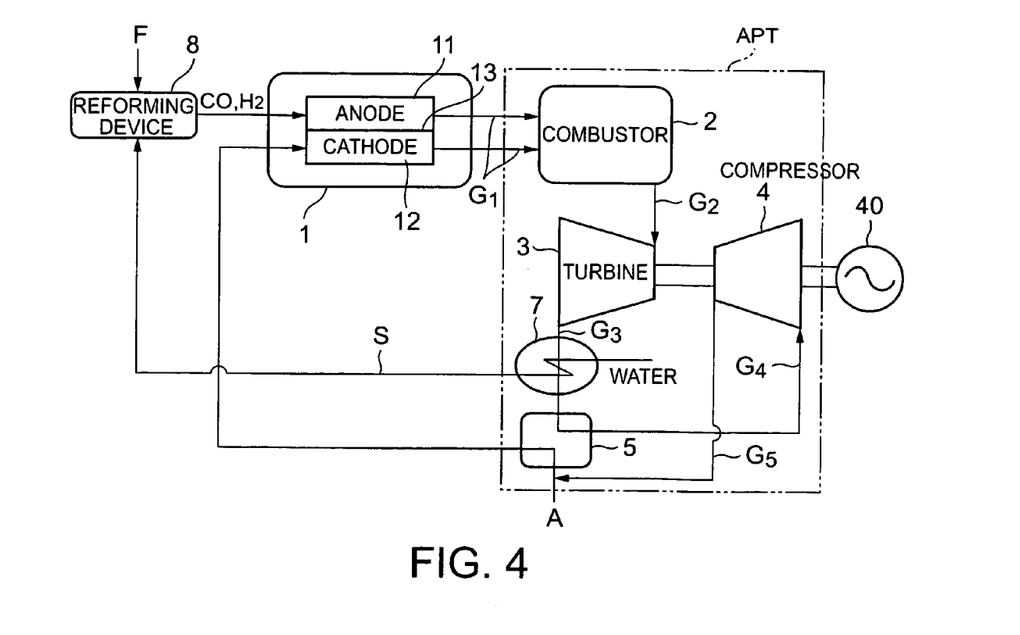
FIG. 4 is a block diagram of a fuel cell-atmospheric-pressure turbine hybrid system in a fourth embodiment according to the present invention.

FIG. 4 shows a fuel cell-atmospheric-pressure turbine hybrid system in a fourth embodiment according to the present invention. The fuel cell-atmospheric-pressure turbine hybrid system in the fourth embodiment includes, in addition to components corresponding to those of the first embodiment shown in FIG. 1, an evaporator 7 connected to the outlet of the turbine 3 and a reforming device 8 connected to the evaporator 7. The evaporator 7 generates steam S by heat recovered from the exhaust gas G3 discharged from the turbine 3. The reforming device 8 decomposes the fuel F into CO and $H_2$ by using the steam S generated by the evaporator 7 and supplies CO and $H_2$ to the fuel cell 1. Thus the hybrid system is able to reform the fuel F by using waste heat.

Figure 5:
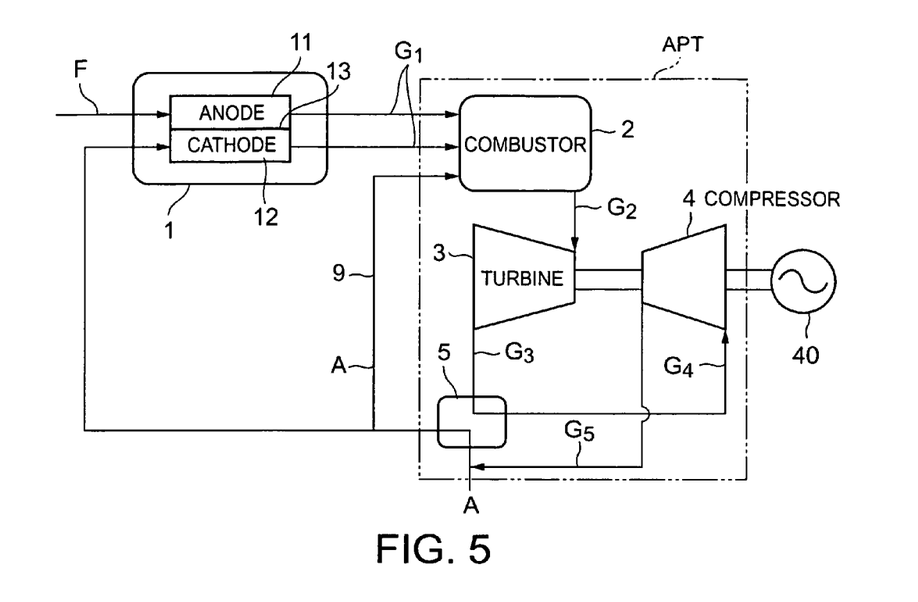
FIG. 5 is a block diagram of a fuel cell-atmospheric-pressure turbine hybrid system in a fifth embodiment according to the present invention.

FIG. 5 shows a fuel cell-atmospheric-pressure turbine hybrid system in a fifth embodiment according to the present invention. The fuel cell-atmospheric-pressure turbine hybrid system in the fifth embodiment includes, in addition to components corresponding to those of the first embodiment shown in FIG. 1, an air intake branch line 9 through which part of the air A to be supplied to the fuel cell 1 flows. When the air A is supplied at an excessively high flow rate to the fuel cell 1, part of the air A is supplied through the air intake branch line 9 directly to the combustor 2. When the air A is supplied at an excessively high flow rate higher than a flow rate suitable for supplying the air A to the fuel cell 1 to the heat exchanger 5 disposed above the fuel cell 1 to cool the exhaust gas G3 discharged from the turbine 3 satisfactorily, excessive air A is carried by the air intake branch line 9 directly to the combustor 2 and is used for burning the cell exhaust gas G1 discharged from the fuel cell 1 in the combustor 2.

Figure 6:
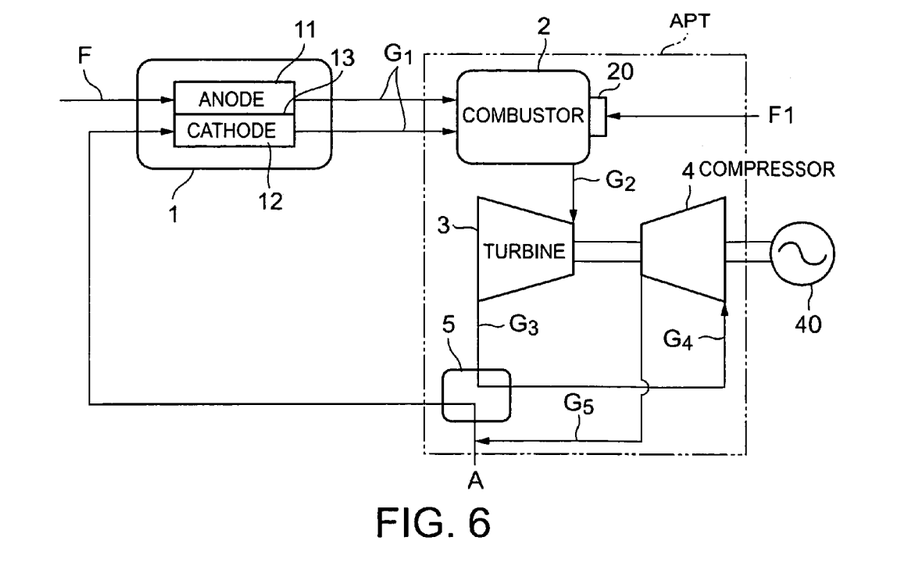
FIG. 6 is a block diagram of a fuel cell-atmospheric-pressure turbine hybrid system in a sixth embodiment according to the present invention.

FIG. 6 shows a fuel cell-atmospheric-pressure turbine hybrid system in a sixth embodiment according to the present invention. The fuel cell-atmospheric-pressure turbine hybrid system in the sixth embodiment includes, in addition to components corresponding to those of the first embodiment, a fuel supply device 20, such as a spray nozzle, for supplying a liquid or gaseous fuel F1 to the combustor 3. The combustor 2 burns the fuel F1 supplied by the fuel supply device 20 to control the combustion temperature of the cell exhaust gas G1 dominating the temperature of the exhaust gas G2 to be supplied to the turbine 3. The control of the temperature of the exhaust gas G2 facilitates the control of the output of the turbine 3. For example, when the combustor 2 is unable to burn the cell exhaust gas G1 at a sufficiently high temperature, the temperature of the exhaust gas G3 to be supplied to the turbine 3 can be increased by burning the fuel F1 supplied by the fuel supply device 20 to the combustor 2 and burning the fuel F1 in the combustor 2.

Figure 7:
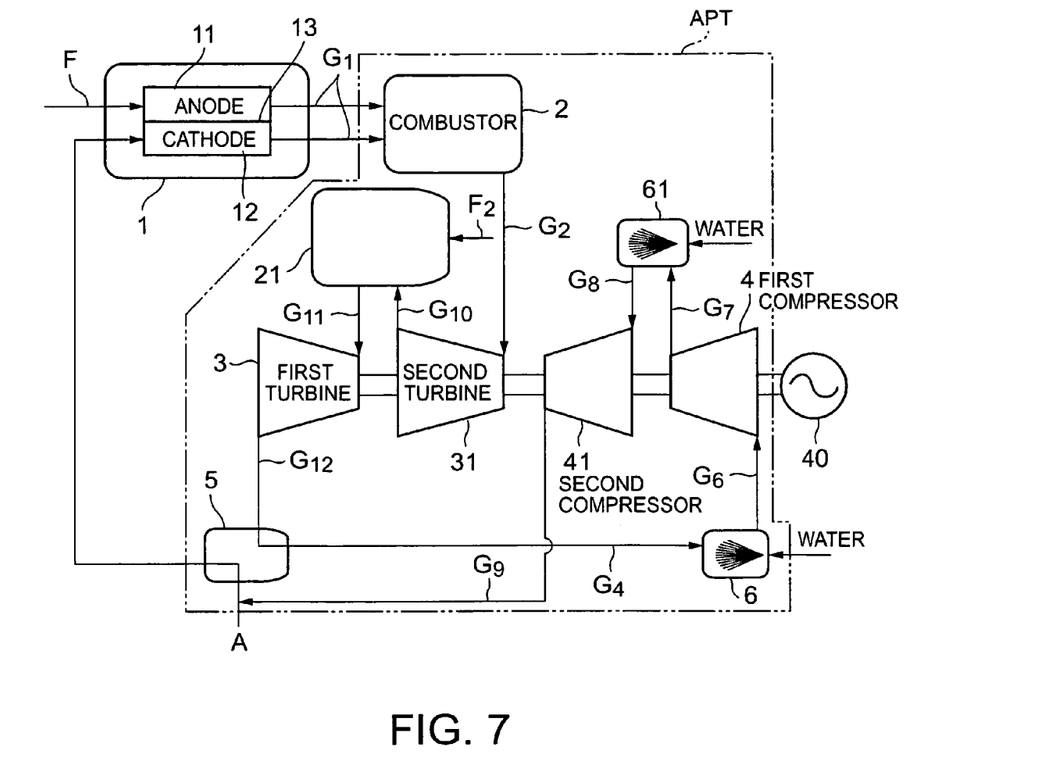
FIG. 7 is a block diagram of a fuel cell-atmospheric-pressure turbine hybrid system in a seventh embodiment according to the present invention.

FIG. 7 shows a fuel cell-atmospheric-pressure turbine hybrid system in a seventh embodiment according to the present invention. The fuel cell-atmospheric-pressure turbine hybrid system in the seventh embodiment includes, in addition to components corresponding to those of the third embodiment shown in FIG. 3, a first turbine 3 corresponding to the turbine 3 of the third embodiment, a second turbine 31 disposed coaxially with the first turbine 3, and a second combustor 21 to which a liquid or gaseous fuel F2 is supplied. An exhaust gas G12 discharged from the first turbine 3 is supplied to the heat exchanger 5. An exhaust gas G10 discharged from the second turbine 31 is mixed in the fuel F2 and burned in the second combustor 21, and a high-temperature exhaust gas G11 is supplied to the first turbine 3. Consequently, the output of the first turbine 3 increases.

Figure 8:
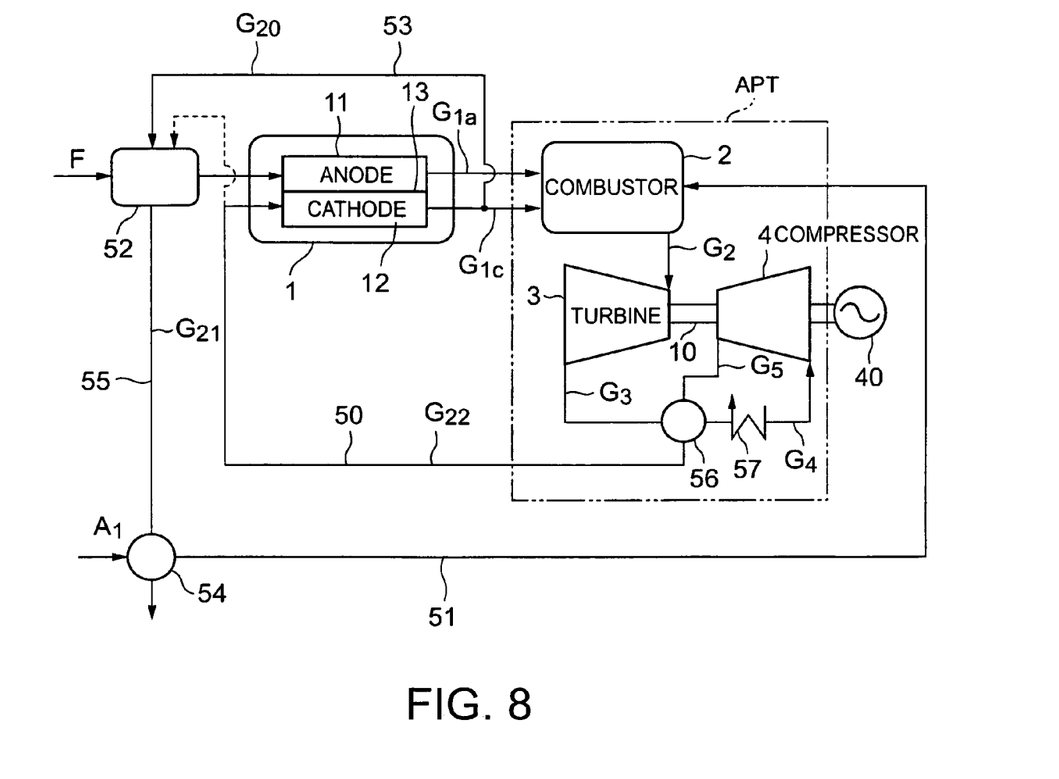
FIG. 8 is a block diagram of a fuel cell-atmospheric-pressure turbine hybrid system in an eighth embodiment according to the present invention.

FIG. 8 shows a fuel cell-atmospheric-pressure turbine hybrid system in an eighth embodiment according to the present invention in a block diagram. The fuel cell-atmospheric-pressure turbine hybrid system in the eighth embodiment includes, similarly to the first embodiment shown in FIG. 1, a combustor (reactor) 2, a turbine 3 and a compressor 4. The outlet of the compressor 4 is connected to the cathode 12 of the fuel cell 1 by an exhaust gas line 50. An air supply line 51 is connected to the combustor 2 to supply air A1 from the environment to the combustor 2.

The exhaust gas G3 discharged from the turbine 3 is compressed by the compressor 4 to raise the pressure of the exhaust gas G3. An exhaust gas G22 discharged from the compressor 4 is supplied through the exhaust gas line 50 directly to the cathode 12 of the fuel cell 1. Thus the thermal energy of the exhaust gas G22 can be effectively used by the fuel cell 1 without using any circulating blower or the like. If the fuel cell 1 is a MCFC, the cathode 12 needs a large quantity of $CO_2$. Since the exhaust gas G22 supplied to the fuel cell 1 contains $CO_2$, the power generation efficiency of the fuel cell 1 is improved. The air A1 is supplied through the air supply line 51 to the combustor 2. Consequently, oxygen gas is supplied at an increased flow rate to the combustor 2, the efficiency of the reaction of the exhaust gas G1 discharged from the fuel cell 1, namely, combustion efficiency, can be increased.

This embodiment is provided with a fuel reforming device 52 for reforming a fuel F to be supplied to the anode 11 of the fuel cell 1. The reforming device 52 is connected to the lower end of the cathode 12 of the fuel cell 1 by an exhaust gas branch line 53. Part G20 of the high-temperature exhaust gas G1 to be supplied from the cathode 12 to the combustor 2 is supplied to the reforming device 52 and is used for reforming the fuel F.

This embodiment is provided with an air preheater 54 for preheating the air A1 that flows through the air supply line 51. The air preheater 54 is connected to the fuel reforming device 52 by an exhaust gas line 55 to preheat the air A1 by the heat of the exhaust gas G21 discharged from the fuel reforming device 52 through heat exchange in the air preheater 54. Thus the preheated air A1 is supplied through the air supply line 51 to the combustor 2. Consequently, the combustion efficiency of the combustor 2 is further improved. If the fuel F is natural gas, the fuel gas F1 is decomposed into CO and $H_2$ by an exhaust gas G20 discharged from the cathode 12, and CO and $H_2$ are supplied to the fuel cell 1.

An exhaust heat exchanger 56 makes an exhaust gas G5 discharged from the compressor 4 and an exhaust gas G3 discharged from the turbine 3 exchange heat. The temperature of the high-temperature exhaust gas G3 discharged from the turbine 3 is decreased through heat exchange in the heat exchanger 56. A spray type cooling device 57 is disposed between the exhaust heat exchanger 56 and the compressor 4. An exhaust gas G4 is cooled by the cooling device 57 and the temperature thereof decreases. The low-temperature exhaust gas G4 is supplied to the compressor 4. Consequently, power necessary for driving the compressor 4 can be reduced. The exhaust gas G5 discharged from the compressor 4 is heated by the heat of the high-temperature exhaust gas G3 discharged from the turbine 3 in the exhaust heat exchanger 56. The high-temperature exhaust gas G22 is supplied to the cathode 12 of the fuel cell 1, which further increases the power generation efficiency of the fuel cell 1. Part of the exhaust gas G22 being supplied from the exhaust heat exchanger 56 to the cathode 12 may be sent to the fuel reforming device 52 to use the thermal energy of the part of the exhaust gas 22 for reforming the fuel F.

The change of state of the exhaust gases discharged from the hybrid system shown in FIG. 8 will be numerically explained. In the following description, the unit of pressures P is bar, the unit of temperatures T is ° C. and the unit of flow rates G is kg/h. Cell output is 250 kW and plant output is 300 kW. The fuel (1.08P, 32.0T, 120G) is reformed by the fuel reforming device 52 and the reformed fuel F is supplied to the anode 11 of the fuel cell 1 to generate power by the fuel cell 1. The exhaust gas G1a discharged from the anode 11 and the exhaust gas G1c discharged from the cathode 12 are supplied to and burned by the combustor 2. The fuel F supplied from the fuel reforming device 52 to the anode 11 has 106P, 580T and 120G, the exhaust gas G1a from the anode 11 has 1.05P, 650T and 620G, and the exhaust gas G1c from the cathode 12 has 1.05P, 650T and 2500G. The exhaust gases G1a and G1c respectively from the anode 11 and the cathode 12 are supplied to the combustor 2. Part of the exhaust gas G1c from the cathode 12 is supplied through the exhaust gas branch line 53 to the fuel reforming device 52 to use the thermal energy of the part of the exhaust gas G1c for reforming the fuel F. The exhaust gas G1c supplied to the combustor 2 has 1.04P, 650T and 1180G. The exhaust gas 20 supplied to the fuel reforming device 52 has 1.04P, 650T and 1320G. The exhaust gas G3 supplied from the combustor 2 to the turbine 3 has 0.99), 820T and 3000G. The exhaust gas G3 discharged from the turbine 3 has 0.33P, 600T and 3000G. The exhaust gas G4 supplied from the exhaust heat exchanger 56 through the cooling device 57 to the compressor 4 has 0.31P, 40.0T and 3000G. The exhaust gas G22 discharged from the compressor 4, heated by the exhaust heat exchanger 56 and supplied through the exhaust gas line 50 to the cathode 12 has 1.06P, 580T and 3000G.

The air A1 taken into the air preheater 54 has 1.01P, 25.0T and 1200G. The exhaust gas G21 passing through the fuel reforming device 52 and heating the air A1 has 1.02P, 414T and 1414G. The preheated air Al flowing through the air supply line 51 into the combustor 2 has 1.00P, 400T and 1200G. The output power of the fuel cell 1 is 250 kW, the power generation efficiency of the fuel cell 1 is 48.0% LHV. The output power of the hybrid system is 300 kW, the power generation efficiency of the hybrid system is 57.6% LHV. Thus a high-power, high-efficiency power generating system is provided.

Figure 9:
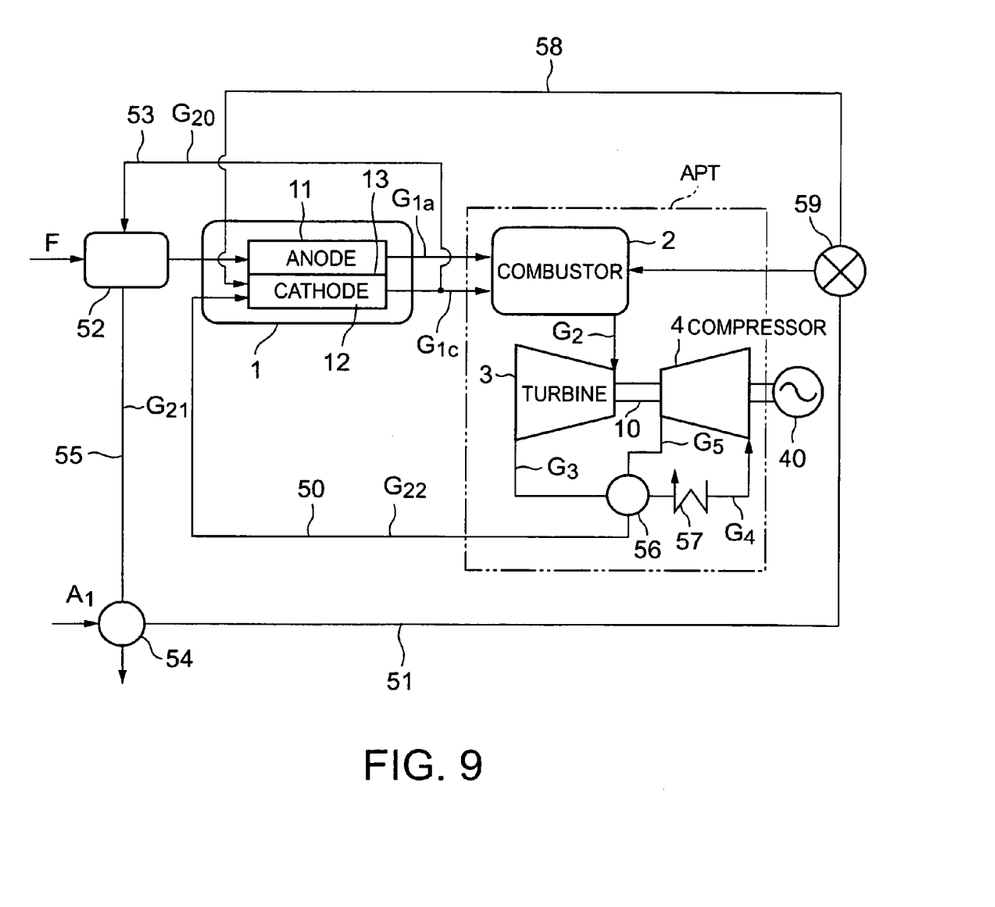
FIG. 9 is a block diagram of a fuel cell-atmospheric-pressure turbine hybrid system in a ninth embodiment according to the present invention.

FIG. 9 shows a fuel cell-atmospheric-pressure turbine hybrid system in a ninth embodiment according to the present invention. A fuel cell 1 included in the fuel cell-atmospheric-pressure turbine hybrid system in the ninth embodiment is a SOFC. The hybrid system in the ninth embodiment includes, in addition to components corresponding to those of the hybrid system in the eighth embodiment, an air supply line 58 branching out from the air supply line 51 and connected to the cathode 12 of the fuel cell 1. Part of the air A1 is supplied through the air supply line 51 to the cathode 12 of the fuel cell 1. An air distribution valve 59 is placed at the joint of the air supply line 51 and 58 to adjust the distribution of the air A1 to the air supply lines 51 and 58.

Part of the air A1 flowing through the air supply line 51 is supplied through the air supply line 58 to the cathode 12 of the fuel cell 1. The cathode 12 of the fuel cell 1, namely, the SOFC, does not need much $CO_2$, but needs much $O_2$. Power generation efficiency is increased by increasing the supply of $O_2$ to the cathode 12 of the fuel cell 1. The air distribution valve 59 adjust the distribution of air to the fuel cell 1 according to the capacity of the fuel cell 1 to supply the air at a proper flow rate to the fuel cell so that the efficiency of the fuel cell 1 may be improved. Distribution of the air can be adjusted according to the type of the fuel cell 1. For example, when the fuel cell 1 is a MCFC requiring much $CO_2$ for efficient power generation, the air distribution valve 59 is operated to stop or decrease the supply of the air A1 to the fuel cell 1 so that the exhaust gas G22 compressed by the compressor 44 and flowing through the exhaust gas line 50 has a high $CO_2$ concentration. When the fuel cell 1 is a SOFC, the air distribution valve 59 is operated to increase the supply of the air A1 to the fuel cell 1. The air distribution valve 59 is not necessarily indispensable. For example, the respective flow rates of the air flowing through a part, extending from the air distribution valve 59, of the air supply line 51 and the air flowing through the air supply line 58 connected to the fuel cell 1 may be adjusted by forming the part, extending from the air distribution valve 59, of the air supply line 51 and the air supply line 58 by pipes of different nominal diameters, respectively.

Although the turbine 3 and the compressor 4 are disposed coaxially in each of the foregoing embodiments, the turbine 3 and the compressor 4 do not necessarily need to be connected by the shaft; the compressor 4 may be driven individually by a motor or the like.

The invention claimed is:

1. A fuel cell-atmospheric-pressure turbine hybrid system comprising:
    a combustor configured to burn a cell exhaust gas discharged from an atmospheric-pressure, high-temperature fuel cell, the atmospheric-pressure, high-temperature fuel cell to which an atmospheric pressure air and an atmospheric pressure fuel are supplied at an atmospheric pressure and from which the cell exhaust gas is discharged at the atmospheric pressure;
    a turbine in which a combustion gas discharged at the atmospheric pressure from the combustor expands and the pressure of the combustion gas drops to a negative pressure lower than the atmospheric pressure, the turbine being configured to discharge a turbine exhaust gas at the negative pressure;
    a compressor configured to compress the turbine exhaust gas discharged from the turbine to increase the pressure of the turbine exhaust gas to the atmospheric pressure and to discharge a compressor exhaust gas at the atmospheric pressure; and
    a heat exchanger configured to transfer heat from the turbine temperature exhaust gas discharged from the turbine to the atmospheric pressure air to be supplied to the fuel cell;
    an evaporator capable of recovering heat from the turbine exhaust gas discharged from the turbine and generating steam by the recovered heat; and
    a reforming device configured to reform the atmospheric pressure fuel by using steam generated by the evaporator and to supply the reformed fuel to the fuel cell.

2. The fuel cell-atmospheric-pressure turbine hybrid system according to claim 1, wherein the compressor exhaust gas discharged from the compressor is mixed in the atmospheric pressure air to be supplied to the fuel cell.

3. The fuel cell-atmospheric-pressure turbine hybrid system according to claim 1 further comprising a cooling device disposed below the heat exchanger and configured to cool the turbine exhaust gas discharged from the heat exchanger.

4. The fuel cell-atmospheric-pressure turbine hybrid system according to claim 3,
wherein the compressor comprises a first compressor and a second compressor disposed coaxially with the first compressor, and the system further comprises a second cooling device disposed between the first compressor and the second compressor,
the first compressor being configured to compress the turbine exhaust gas discharged from the turbine to increase the pressure of the turbine exhaust gas and to discharge a first compressor exhaust gas,
the second cooling device being configured to cool the first compressor exhaust gas discharged from the first compressor,
the second compressor being configured to compress the first compressor exhaust gas from the second cooling device to increase the pressure of the first compressor exhaust gas and to discharge the second compressor exhaust gas at the atmospheric pressure as the compressor exhaust gas.

5. The fuel cell-atmospheric-pressure turbine hybrid system according to claim 1 wherein an air intake branch line through which part of the atmospheric pressure air to be supplied to the fuel cell is supplied to the combustor.

6. The fuel cell-atmospheric-pressure turbine hybrid system according to claim 1 further comprising a fuel supply device configured to supply a fuel other than the cell exhaust gas to the combustor.

7. The fuel cell-atmospheric-pressure turbine hybrid system according to claim 1,
wherein the combustor has a first combustor and a second combustor, the first combustor being configured to burn the cell exhaust gas discharged from the atmospheric-pressure, high-temperature fuel cell and to discharge the combustion gas at the atmospheric pressure,
the turbine has a first turbine and a second turbine disposed coaxially with the first turbine, in the second turbine the combustion gas discharged from the first combustor expands and the pressure of the combustion gas drops to a first negative pressure lower than the atmospheric pressure,
the second combustor being capable of burning a fuel and the exhaust gas discharged from the second turbine and being configured to discharge a second combustion gas to the first turbine,
the first turbine in which the second combustion gas discharged from the second combustion expands and the pressure of the second combustion gas drops to the negative pressure, the first turbine being configured to discharge the turbine exhaust gas at the negative pressure,
the compressor compresses the turbine exhaust gas discharged from the first turbine to increase the pressure of the turbine exhaust gas to the atmospheric pressure.

8. A fuel cell-atmospheric-pressure turbine hybrid system comprising:
a combustor configured to burn a cell exhaust gas discharged from an atmospheric-pressure, high-temperature fuel cell, the atmospheric-pressure, high-temperature fuel cell to which an atmospheric pressure air and an atmospheric pressure fuel are supplied at an atmospheric pressure and from which the cell exhaust gas is discharged at the atmospheric pressure;
a turbine in which a combustion gas of a pressure substantially equal to the atmospheric pressure discharged from the combustor expands and the pressure of the combustion gas drops to a negative pressure lower than the atmospheric pressure, the turbine being configured to discharge a turbine exhaust gas at the negative pressure;
a compressor configured to compress the turbine exhaust gas discharged from the turbine to increase the pressure of the turbine exhaust gas to the atmospheric pressure and to discharge a compressor exhaust gas at the atmospheric pressure;
an air supply line through which air at the atmospheric pressure is supplied to the combustor;
an evaporator capable of recovering heat from the turbine exhaust gas discharged from the turbine and generating steam by the recovered heat, and
a reforming device configured to reform the atmospheric pressure fuel by using steam generated by the evaporator and to supply the reformed fuel to the fuel cell.

9. The fuel cell-atmospheric-pressure turbine hybrid system according to claim 8 further comprising a heat exchanger configured to transfer heat of the turbine exhaust gas discharged from the turbine to the compressor exhaust gas discharged from the compressor.

10. The fuel cell-atmospheric-pressure turbine hybrid system according to claim 8 further comprising an air supply branch line branched from the air supply line and configured to supply part of air flowing through the air supply line to the fuel cell.

11. The fuel cell-atmospheric-pressure turbine hybrid system according to claim 10 further comprising an air distribution valve placed at the joint of the air supply line and the air supply branch line and configured to adjust the distribution of air to the air supply line and the air supply branch line.

* * * * *